Figure 1:
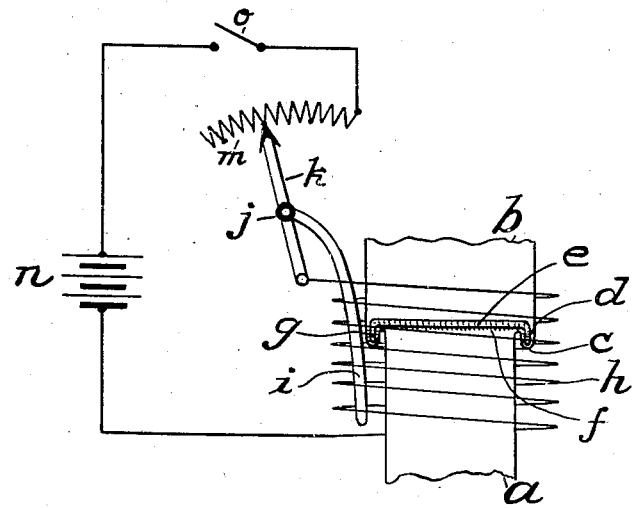

A. HENWOOD.
PROCESS OF OXIDIZING AMMONIA TO NITRIC ACID.
APPLICATION FILED JULY 8, 1918.

1,347,158. Patented July 20, 1920.

WITNESS:
Rob R Mitchel.

INVENTOR
Abraham Henwood
BY
Frank L Busser
ATTORNEY.

UNITED STATES PATENT OFFICE.

ABRAHAM HENWOOD, OF CYNWYD, PENNSYLVANIA.

PROCESS OF OXIDIZING AMMONIA TO NITRIC ACID.

1,347,158.     Specification of Letters Patent.     Patented July 20, 1920.

Application filed July 8, 1918. Serial No. 243,758.

*To all whom it may concern:*

Be it known that I, ABRAHAM HENWOOD, a citizen of the United States, residing at Cynwyd, county of Montgomery, and State of Pennsylvania, have invented a new and useful Improvement in Processes of Oxidizing Ammonia to Nitric Acid, of which the following is a full, clear, and exact description, reference being had to the accompanying drawings, which form a part of this specification.

The purpose of my invention is to secure a maximum yield of nitric acid of maximum concentration from the oxidation of ammonia gas.

In an application filed by me July 11, 1917, Serial No. 179,804, now Patent No. 1,309,622, July 15, 1919, for process of the oxidation of ammonia to nitric acid, I have set forth a process wherein ammonia gas and oxygen are passed over a catalyzer while maintaining a partial pressure of oxygen equal to or greater than twice the partial pressure of the ammonia gas and forming the majority, and preferably at least two-thirds, of the total gas pressure, the pressure being sufficient to promote rapid reaction but insufficient to cause excessive heating of the catalytic body or to cause heating to a point detrimental to the formation of nitric acid. The said application also sets forth other features of novelty, some of which are not therein claimed.

The invention herein set forth and claimed comprises a process wherein ammonia gas and oxygen are passed through a continuous porous or permeable contact or reaction surface, or diaphragm, of catalytic material, preferably platinum sponge, the mass of the catalytic material being so small as not to be self-sustaining but distributed uniformly and practically continuously over the surface of a porous or permeable material which is preferably non-metallic, non-catalytic, and a poor conductor of heat.

The passage of the gases through a catalyzer composed exclusively of platinum sponge and held on a non-catalytic support is described in said application Serial No. 179,804.

In the present application, the construction, and process of manufacture, of a highly efficient form of such catalyzer, is specifically described, its special adaptability to the oxidation of ammonia to nitric acid being the basic discovery characterizing the present invention. By its use, the process of said application may be carried out with a higher degree of success and with more uniform and certain results than with the employment of any of the old and well known types of catalyzers. Further, if my improved process of passing the mixed gases over or through such a catalyzer is used in connection with other old and well known processes of oxidizing ammonia gas to nitric acid, a better and more uniform yield is obtained, with less decomposition of the nitric acid and less danger of explosion.

In connection with the description of the invention herein claimed I shall also describe the method of maintaining an ideal temperature at the point of reaction by gas control, (preferably by excess of oxygen) tending to maintain the temperature sufficiently low to avoid decomposition of nitric acid and by outside automatically acting thermostatically-controlled electric heating means operating to prevent the temperature falling below the range required to secure maximum concentration of nitric acid. It will be understood, however, that my invention is not restricted to a process in which such temperature regulating means is employed.

Preliminarily to the specific description of the process forming the subject-matter of this application, it may be stated that it is recognized that the chemical action takes place at the surface of the catalytic material. When, therefore, the catalytic material is expensive or difficult to obtain, it is obviously desirable that it should present to the gases to be combined the greatest possible area proportionate to its bulk.

There are other reasons which imperatively require the avoidance of a superfluous bulk of the catalytic material. Thus, the tendency is for the catalyzer to become very highly heated during the reaction, and even at a moderately high temperature the product of the reaction decomposes, as illustrated, in the case of nitric acid, by the following equation:

$$4HNO_3 = 2H_2O + 4NO_2 + O_2$$

Assuming a catalyzer of requisite activity, such as platinum, the greater its bulk or mass, the greater its capacity for holding heat; and hence the higher the temperature and the greater the decomposition.

The art has recognized the advisability of presenting a relatively large surface of catalytic material to the gases to be combined, but has effected no more than an approach toward the ideal condition, and in some instances the object sought has been partially attained only at the expense of creating other deleterious conditions obstructive of successful operation. A few examples will suffice.

Platinum and other metals have been used as catalyzers in the shape of fine screens. Such catalyzers have the advantage of a uniform distribution of the orifices through which the gases pass, thereby largely avoiding the unequal elevation of temperature in different parts of the catalyzer; but however fine the mesh may practically be, it is clear that a large part of the catalytic material is not at the surface and therefore is practically inert. But such inactive part of the material acts to absorb and retain heat, and hence the temperature elevation exceeds the safe minimum. Moreover, where platinum is employed, the cost of the material is excessive. These objections apply with still greater force where the gases are passed through a tube of platinum contained within a tube of alundum.

An efficient catalyzer largely used in the oxidation of sulfurous anhydrid to sulfuric anhydrid is that formed by the deposition of platinum on granular magnesium sulfate or other salt or mixture of salts. In the preparation of this catalyzer, however, it is found impossible to even approximately completely coat the granular base, the platinum being deposited discontinuously so as to cover actually a relatively small part of the surface of the grains, thus not only necessitating the use of a considerable bulk of material, but reducing the efficiency of the catalyzer, in that the reacting gases cannot pass through the salts without contacting with a relatively large surface of inert or non-catalytic material. The same objections apply to the deposition of nickel on finely divided charcoal.

Platinum sponge in such bulk as to be self-sustaining has also been proposed, and is an efficient catalyzer, but it is open, in less degree, to the objections applicable to platinum screens, in that a large proportion of the mass is below the surface and inactive. Substantially the same objections apply to a mixture of thorium oxid and radio active uranium oxid applied to fire clay or porcelain.

Platinized asbestos has also been successfully employed, but the asbestos, like the magnesium salts, has been coated in a pronouncedly discontinuous manner. Platinized clay has also been proposed but is open to the same objection. Another objection common to platinized asbestos and platinum sponge (as ordinarily used) and other catalyzers is that the interstices are not regularly distributed and a larger volume of gases passes through the wider channels than through the more restricted ones, thereby causing an unequal heating of the mass, and rendering it impossible to maintain the whole mass at any uniform temperature and therefore making it impossible to hold the whole mass at the relatively low temperature required to prevent partial decomposition.

In the present process oxygen and ammonia gas are passed against, over or through a continuous porous or permeable contact or reaction surface, or diaphragm, of catalytic material, preferably platinum sponge, the mass of catalytic material being so small as not to be self-sustaining but distributed uniformly over the surface of a porous or permeable material which is preferably non-metallic, non-catalytic, and a poor conductor of heat.

A base or support of such material of any suitable shape, so covered with a coating, film or diaphragm of platinum, is placed in the channel provided for the reaction gases so that the latter must pass over or through the same and hence be brought into reactive contact with the continuous surface of platinum. Thus I attain maximum economy, even distribution, minimum mass and uniform temperature, and insure that practically every molecule of the reaction gases will be subjected, and in the same degree, to the influence of the catalyzer.

While the method of preparing the catalyzer or the mechanical construction of the same is no part of the present invention, information thereon will be of assistance in carrying out the process embodying the present invention. I take a support, which may be in the shape of a disk, hemisphere, tube, or any other shape, made of porous or permeable material, such as alundum or silica. The catalytic material, preferably platinum, is deposited, formed or placed, on either or both surfaces of the support, but preferably only on one surface. The catalytic material may be applied in various ways, as by impregnating with suitable materials together with surface application of a supplemental material, by spraying, or otherwise, followed, when necessary, by chemical reaction of the materials used, by the application of heat or by the action of reducing agents, gaseous or in solution, so that there results a continuous coating or surface of the desired catalytic material of regulated and desired thickness.

A preferred procedure is to soak an alundum support in ammonium chlorid, dry it, remove any excess from the surface, spray upon the surface a platinum chlorid solution, thereby forming on the surface a precipitate of ammonium chlorplatinate, and then dry and ignite, thus burning off or volatilizing ammonia, hydrogen chlorid, steam and chlorin, and leaving a superficial layer of platinum sponge.

To prevent cracking of the support due to expansion and contraction resulting from variation of temperature at the beginning and end of a run, the edge of the support may be sustained in a groove containing a plastic lute, composed of a vitreous substance of the proper degree of viscosity at the working temperature, and which is chemically inert to the reaction gases, thereby providing a hermetical seal which allows the support to expand as it is heated and contract as it is cooled. I prefer to use a sustaining seal or lute composed of boric acid.

Where it is desired or found advisable to secure a fine and certain adjustment of the temperature, I use, as hereinbefore stated, sufficient excess oxygen, or, less desirably, sufficiently reduce the gas speed so that the temperature will tend to border on, or even sink below, the lower limit of the range of permissible temperatures, and then add heat from outside, by automatically-controlled, and preferably thermostatically - controlled means to maintain the temperature safely above the lower limit of the range of permissible temperatures, thereby offsetting what would otherwise be objectionable depressions of temperature below that at which the reaction takes place advantageously. The heating may be effected by a resistance wire winding arranged in an electric circuit and in proximity to the catalyzer and also to a thermostatic element which is connected to, and operates, a rheostat controlling the flow of electric current, so as to cut out resistance as the temperature decreases and introduce resistance as the temperature increases and break the circuit altogether at any desired upper limit of temperature.

The practice of my process does not depend upon the employment of any particular apparatus, and any known apparatus for mixing the gases of reaction and for condensing the nitric acid may be employed. That part of the apparatus including and adjacent the catalyzer may also be constructed and arranged as desired, provided the construction and arrangement are such as to permit the effective execution of the process. The annexed drawing, therefore, must be considered as merely illustrative of one of different ways available for practising the process.

Figure 2:
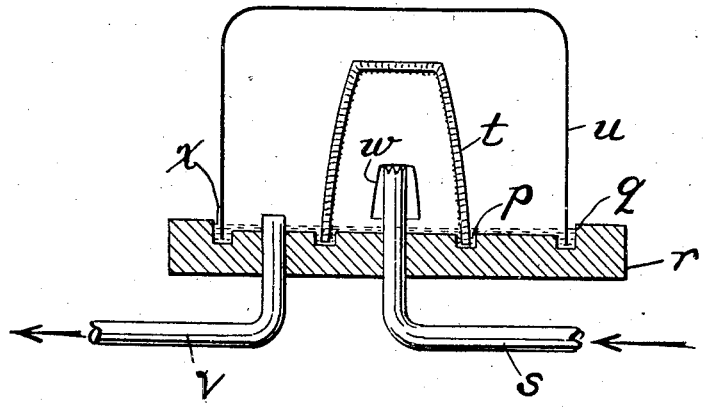

Figure 1 is a diagram of that part of the apparatus which may be conveniently called the reaction chamber, including the thermostatically - controlled outside heating means. Fig. 2 is a similar view of a modification with outside heating means omitted.

In Fig. 1, $a$ and $b$ are two sections of a tube or chamber into which the gases of reaction pass and combine to form nitric acid. The tube, at the junction of the two sections, is bent circumferentially to form a circumferential groove $c$ containing boric acid $d$ or some equivalent substance that is plastic, vitreous, viscous and chemically inert to the gases. The disk-shaped support $e$ composed (say) of silica, holding distributed over its surface, in a continuous manner, platinum sponge $f$, has a depending peripheral flange $g$ resting in the groove $c$ and embedded in the plastic lute $d$, which, while providing an hermetical seal, allows the disk $e$ to expand and contract. The support is either inherently porous or is provided with perforations which permit the free flow therethrough of gas and acid. It is also adapted to be highly heated without injury and to retain the heat from the reaction taking place at this point.

A resistance wire winding $h$ incloses the tube containing the catalyzer and is coiled also about the stem of a thermostatic element $i$, whose outer end, insulated at $j$, is connected with the arm $k$ of a rheostat $m$, by which the flow of current from a battery $n$ is controlled. A switch $o$ provides for opening the circuit when automatic operation is not desired or required.

In Fig. 2, I show a base $r$ provided with two concentric grooves $p$ and $q$. Through the base extends a gas inlet pipe $s$. A catalyzer support $t$, which may be of alundum and of inverted cup shape, is coated on its inside face with platinum sponge, and rests in the inner groove $p$. A cover $u$, of pyrex glass, overlies and surrounds, and is spaced from, the support $t$ and rests in the groove $q$. An outlet pipe $v$ for the product of the reaction extends through the base $r$ and communicates with the space between the cover $u$ and the support $t$. A hood or deflector $w$ is placed over the mouth of the inlet pipe $s$ to distribute the entering gases within the chamber inclosed by the support $t$ preparatory to their passage through the cup. The lower edge of the cup $t$, resting in the groove $p$, is embedded in a plastic lute $x$ of boric acid or other suitable material. I prefer to flow the boric acid over the surface of the base $r$ so that it will fill and overflow the grooves and provide a protective covering or enamel for the bottom of the reaction chamber.

Where, in the claims, I mention the passage of the mixed gases through the diaphragm of platinum sponge and through the support for the catalyzer, it will be understood that it is not intended to imply that after their passage through the same, the gases are in their original condition, they in fact combining, during such passage, to form nitric acid.

I do not herein claim the catalyzer, or the combined catalyzer and support therefor, or the means for retaining the support in position and at the same time permitting it to expand or contract, as the same form the subject-matter of a separate application filed June 25, 1918, Serial No. 241,724 now Patent No. 1,309,623, July 15, 1919. Nor do I herein claim the described process of regulating the temperature at the point of reaction, as the same forms the subject-matter of a divisional application filed January 9, 1919, Serial No. 270,409. Nor do I herein claim the described process of catalytically oxidizing ammonia gas to nitric acid involving flexibly supporting the catalyzer carrier, as the same forms the subject-matter of a divisional application filed January 9, 1919, Serial No. 270,410.

Having now fully described my invention, what I claim and desire to protect by Letters Patent is:

1. The improvement in the art of catalytically combining gases which comprises passing the mixture containing the gases to be combined through a diaphragm of catalytic material of such negligible thickness that substantially the entire mass of the catalyzer is active.

2. The improvement in the art of catalytically combining gases which comprises passing the mixture containing the gases to be combined through a substantially continuous permeable diaphragm consisting wholly of platinum sponge.

3. The improvement in the art of catalytically combining gases which comprises passing the mixture containing the gases to be combined through a porous diaphragm of catalytic material presenting an extended and substantially continuous surface of such negligible thickness that substantially the entire mass is active.

4. The improvement in the art of catalytically combining gases which comprises passing the mixture containing the gases to be combined through a porous support presenting an extended surface and a permeable catalyzer distributed over the surface of the support and of such negligible thickness that substantially the entire mass of the catalyzer is active.

5. The improvement in the art of catalytically combining gases which comprises passing the mixture containing the gases to be combined through a porous support presenting an extended surface and a permeable catalyzer consisting wholly of platinum sponge distributed in a substantially continuous manner over the surface of the support.

6. The improvement in the art of catalytically combining gases which comprises passing the mixture containing the gases to be combined through a porous support presenting an extended surface and a permeable catalyzer distributed over the surface of the support and presenting a substantially continuous surface of negligible thickness whereby the entire catalytic mass is rendered active.

7. The improvement in the art of oxidizing ammonia gas into nitric acid which consists in passing a mixture containing ammonia gas and oxygen through a porous support presenting an extended surface and a permeable catalyzer distributed over the surface of the support and presenting a substantially continuous surface of negligible thickness whereby the entire catalytic mass is rendered active.

In testimony of which invention I have hereunto set my hand at Philadelphia, Penna., on this 5th day of July, 1918.

ABRAHAM HENWOOD.